(No Model.)
E. W. JENKINS.
COMMODE.
No. 569,206.   Patented Oct. 13, 1896.
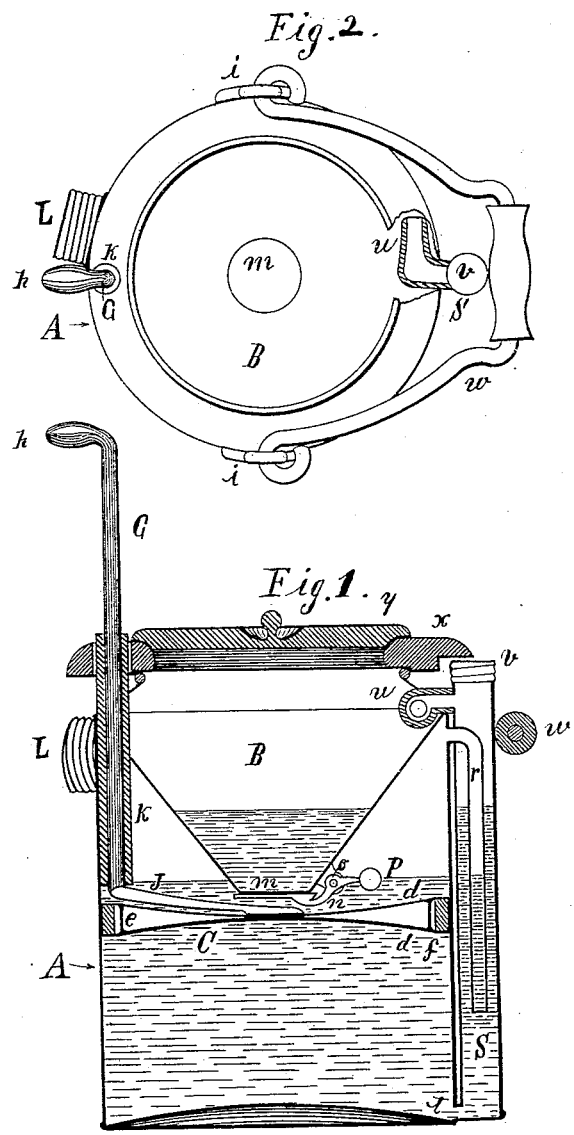
Witnesses
M. E. Cowden
Theodore Jacob
Inventor
Edward W Jenkins

UNITED STATES PATENT OFFICE.

EDWARD W. JENKINS, OF DURBIN, NORTH DAKOTA.

COMMODE.

SPECIFICATION forming part of Letters Patent No. 569,206, dated October 13, 1896.

Application filed March 23, 1894. Serial No. 504,754. (No model.)

*To all whom it may concern:*

Be it known that I, EDWARD W. JENKINS, a citizen of the United States, residing at Durbin, in the county of Cass and State of North Dakota, have invented an Improvement in Commodes, of which the following is a specification.

My invention relates to improvements in commodes, with a seat and a flush-bowl especially adapted where plumbing and sewerage are not to be had, and includes certain improvements in construction and in combination of parts, which are hereinafter more fully described and claimed.

The object of my invention is to provide a commode with a water circulation through the bowl, a bowl with a seat so arranged with means as to wash out and secure the excrements from odor conveniently arranged to operate and transfer to any part of the house without connections with a sewer, and in order to carry out my object I construct a portable water-closet with a bowl, sink, and reservoir, the peculiar part of its construction of which is the circulation of water flushing the bowl and secreting its contents, conveniently arranged to convey, cleanse, and charge with fresh water, all of which are fully set forth in the following specification and shown in the accompanying drawings.

Figure 1 is a vertical section of the entire commode. Fig. 2 is a top view as it appears after the removal of the seat from the bowl and having a section of the conical rim on top of the bowl cut away, exposing the flushing-nozzle of the bowl.

Similar letters refer to similar parts throughout the several views.

A is a cylindrical tank or vessel, made of tin or any sheet metal, with a straight smooth bore closed at the top with a funnel-shaped bowl B, also sheet metal, with the top turned inward, forming a conical-top rim to keep the water from flying out of the bowl. The cone of the bowl extends down into the vessel A in close proximity to a partition or piston-head C, closely fitted within the vessel, free to move up or down from the bottom of the bowl to the bottom of the vessel. The piston-head is made light, of two concave disks of sheet metal *d d*, with their convex sides secured together at the center and braced with a ring *e*, soldered between the disks near their outer edge, leaving room for a gum packing-ring *f*, thus forming practically a water-tight partition for the purpose intended, dividing the vessel in two compartments, a sink for the bowl above the partition and a reservoir for fresh water below the partition. The recess formed in the partition between the disks *d d* in the convex serves as air-space to balance said partition while immersed in water.

Extending down in the side of the vessel is a rod G, with a handle *h* at the top and an arm J at the bottom, with the end of the arm firmly secured to the center of the said partition C. By means of the rod G the said partition may be adjusted up or down.

Secured to the side of the vessel, incasing the rod G, is a tube K, soldered air-tight above in the vessel and serving as a guide to the rod. At the bottom of the bowl B is a valve having a plate *m* to close the opening in the bottom of the bowl upward, with an arm *n* fulcrumed to the bowl at *o* and having a weight to close the valve. At the extreme top of the vessel is attached a pipe *r*, communicating within said vessel and extending well down into the tube S, serving as a check-valve. The tube S is secured outside of the vessel, communicating with the bottom of said vessel through an opening *t* and at the top with the bowl through the nozzle *u* in the upper-cornered periphery of the bowl, said nozzle directed to one side to inject parallel with the periphery of the bowl, forming a flush-bowl and giving a water circulation through the bowl into its sink below. On top of the tube S is a screw-cap *v*, closing the tube through which the reservoir is charged with water, and at the upper corner of the vessel is an opening from the sink closed with a screw-cap L, through which to discharge its contents.

To convey the commode, ears *i* are secured to the top of the vessel, connected with an ordinary bucket-handle *w*. A wooden seat *x*, of ordinary pattern, is fitted over the top of the bowl and supported thereby, having a lid *y*, that caps the commode.

The operation of the commode is as follows: First, the vessel is filled with water, as shown in Fig. 1. To fill the reservoir, the partition is supposed to be at the bottom of the vessel, and by taking off the screw-cap $v$ on top of the circulating-tube S water is run in the tube, which enters at the bottom through the opening $t$ and underneath the partition, bearing it up close to the bowl. As the reservoir fills, the cap is then replaced and water run into the top of the bowl. The water at first enters through the valve in the bottom of the bowl, while the air in the meantime escapes until the water floods the valve and confines the air, when it fills up in the bowl to the height desired. The compartments within the vessel are air and water tight, and when properly charged with water will not fill up around the cone of the bowl above the valve until the air is expelled. A cavity therefore remains around the cone in the sink. The relative position of the water in the circulating-tube S would be level with the water in the bowl, and water will enter the pipe $r$, level with the contents of the sink, until the partition is adjusted downward, when it is obvious that a circulation takes place. As the hand is applied to the rod G, connected to the partition C, and said partition forced down an inch, the contents of the bowl would be drawn after and deposited in the sink, filling up the displacement made above the partition, while the water in the reservoir below the partition would be forced out through the opening $t$ into the tube S and injected into the bowl B through the nozzle $u$, circulating a volume of fresh water in around the bowl and through the bowl, as it escapes in the meantime through the valve into the sink; but on account of the rotary motion imparted to the water around the bowl as it is forced from the nozzle the water cannot all escape into the sink before the valve in the bottom of the bowl closes. As the partition stops a portion of the water then is left in the bowl to come to a rest and settle in the bottom of the bowl over the valve, sealing the sink free of odor.

In order to entirely discharge the contents of the bowl and secure the surplus that the bowl receives, the rod G is first given a lift up and then a downward movement. The contents now of the sink are raised with the partition higher up in the cavity, while the air is expelled out through the pipe $r$ into the tube S, where it escapes up the tube and out. The column of water in the tube S, in consequence of the upward adjustment of the partition, falls and runs back into the reservoir to fill up that displacement. The downward course of the partition now draws on the bowl again while the tube is refilling. The supply of water now to the bowl has lost time corresponding with the air expelled from the cavity, and the contents of the bowl are drawn into the sink in advance of the flush in the bowl. Therefore by a short up-and-downward movement the surplus that the bowl accumulates will be pumped into the sink under and around the cone of the bowl, filling up the cavity and expelling the air through the pipe $r$, which allows air to escape, but none to enter. As the lower end dips in the water in the tube S it would have to take water, therefore serving as a check-valve for the purpose required and perfectly air-tight until forced to allow the air to escape with undue pressure in the cavity by the upward adjustment of the partition, which blows the water out of the pipe, and the air escapes.

After the water in the reservoir is exhausted the partition will be at the bottom. The seat can be taken off and the vessel conveyed off and contents discharged through the opening above, closed air-tight with a screw-cap L. By throwing water into the bowl it will find its way through the valve in the bottom of the bowl and into the vessel to sufficiently wash it out, when the cap L must be firmly screwed on, when it is ready to fill with water, as previously explained.

I do not limit myself to any particular means of adjusting the partition or producing the circulation, as the device shown may be modified in various ways. Neither do I limit myself to any number of nozzles or injecting-tubes, as the more nozzles there are located around the bowl the more perfect the flush will be with a weak impulse and the better the sides of the bowl will be washed down into the sink below.

I am aware that there are water-closet flush-bowls, washouts, &c., connected to a sewer, but am not aware that there is a portable closet or commode with means of circulating water through the bowl, retaining and secreting the refuse matter from the bowl in the commode.

Having now described my invention, what I claim as new, and desire to secure by Letters Patent, is—

1. In a commode the combination of an air-tight chamber, to fill with water, having a bowl in its top, a pipe $r$ communicating with said chamber at the top near the bowl, and extending well down in contact with the water, a circulating-tube S, communicating with the bottom of the chamber, and the top of the bowl, arranged to confine a pressure of air within the chamber, below the bowl, and support a column of water in the bowl, above the level of water in the chamber, and means for relaxing the pressure, and draw the contents of the bowl into the chamber.

2. In a commode the combination of an air-tight chamber to fill with water, having a bowl in its top, a check-valve in the bottom of the bowl, a piston fitting said chamber, and mechanism to work said piston, and produce a pressure within the chamber and against said valve, as and for the purpose specified.

3. In a commode the combination of a water vessel with a bowl in its top, a check-valve in the bottom of the bowl, a circulating-tube S communicating with the bottom of the vessel and the top of said bowl, and means of circulating water through said tube into said bowl, a movable partition fitting said vessel, and dividing the vessel, into upper and lower compartments, said partition arranged to work to the bottom of the vessel, as the water discharges from the lower compartment, converting the space of the lower compartment, into the upper, available for the use of said bowl substantially as described.

4. In a commode the combination of a water-bucket, with a handle $w$, secured to the bucket, having a bowl in its top, a check-valve in the bottom of the bowl a piston fitting within said bucket dividing the same into upper and lower compartments, a tube $r$, connecting the bucket communicating with the upper part near the bowl and extending well down in contact with the water, a circulating-tube connecting the vessel, and communicating with the lower part of the vessel below the piston and the top of the bowl for the purpose specified.

5. In a commode the combination of a cylindrical chamber, having a bowl in its top, a check-valve in the bottom of the bowl, a piston fitting tightly in said chamber, a tube S, communicating with the bottom of the chamber, and the top of the bowl, a tube $r$ connecting to the chamber near the top of the space between the piston and the bowl, and arranged to extend well down in contact with the water, and means for moving said piston as and for the purpose specified.

6. In a commode the combination of a cylindrical chamber having a bowl arranged in the upper part thereof, a check-valve in the bottom of said bowl having a plate $m$ of suitable material fitting over and tightly closing the aperture in said bottom, a circulating-tube communicating with the bottom of said chamber and top of said bowl, and pumping mechanism for discharging water through said tube, from said chamber into said bowl, and, for emptying said bowl substantially as set forth.

EDWARD W. JENKINS.

Witnesses:
 FREAS STYER,
 WALTER DERR.